United States Patent [19]

Seufert

[11] 3,808,015
[45] Apr. 30, 1974

[54] ALUMINA FIBER

[75] Inventor: Ludwig Edward Seufert, Boothwyn, Pa.

[73] Assignee: E. I. du Pont de Nemours and Company, Wilmington, Del.

[22] Filed: May 12, 1972

[21] Appl. No.: 252,812

Related U.S. Application Data

[63] Continuation-in-part of Ser. No. 92,278, Nov. 23, 1970, abandoned, which is a continuation-in-part of Ser. No. 797,310, Dec. 23, 1968, abandoned, which is a continuation-in-part of Ser. No. 656,280, July 26, 1967, abandoned.

[52] U.S. Cl. .................................. 106/65, 106/39.5
[51] Int. Cl. ............................................. C04b 35/10
[58] Field of Search ............... 106/65, 39.5, 92, 278, 106/797, 310, 656, 280

[56] References Cited
UNITED STATES PATENTS

| | | | |
|---|---|---|---|
| 3,311,481 | 3/1967 | Sterry et al. | 106/65 |
| 3,180,741 | 4/1965 | Wainer et al. | 106/65 |
| 3,271,173 | 9/1966 | Lockhart | 106/65 |
| 3,311,689 | 3/1967 | Kelsey | 106/65 |
| 3,503,765 | 3/1970 | Blaze | 106/65 |

*Primary Examiner*—James E. Poer

[57] ABSTRACT

A polycrystalline ceramic oxide fiber containing at least 60% $Al_2O_3$, at least part of which is in an α-alumina phase. The fiber is windable on a bobbin and is of high strength. It is made by spinning a spinnable mix of particles of a small specified size that are at least 80 percent alumina particles, in an aqueous phase that contains a precursor of alumina, such as aluminum chlorohydroxide, or a precursor of an oxide that forms a solid solution with alumina. The usual shrinkage of ceramic oxide fibers during firing is minimized in the fibers of this invention when using the spinnable mix of the invention. In addition, the tendency of freshly spun ceramic oxide fibers to stick is minimized in the fibers of this invention, thus allowing the fibers to be fired while on a bobbin.

25 Claims, 1 Drawing Figure

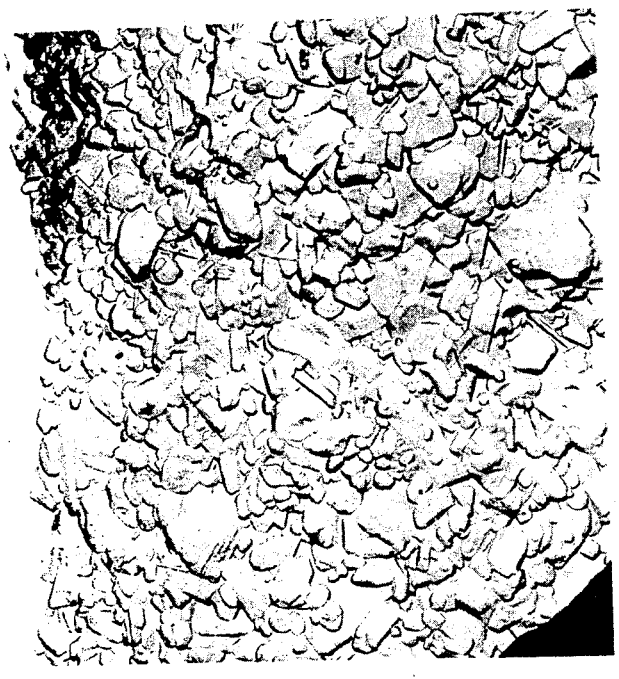
1 MICRON

ALUMINA FIBER

CROSS REFERENCE TO RELATED APPLICATIONS

This application is a continuation-in-part of my application, Ser. No. 92,278, filed Nov. 23, 1970, now abandoned, which is a continuation-in-part of my application, Ser. No. 797,310, filed Dec. 23, 1968, now abandoned, which is a continuation-in-part of my application, Ser. No. 656,280, filed July 26, 1967, now abandoned.

BACKGROUND OF THE INVENTION

Field of the Invention

This invention is directed to novel polycrystalline ceramic oxide fibers containing at least 60% $Al_2O_3$, part of which is in an α-alumina phase; and to a two-phase spinnable mix from which the fibers are spun. The invention is also directed to a process for preparing the fibers from the mix.

Background of the Invention

Alumina fibers have been prepared in the past, but they generally have been of the very short whisker type and/or have not produced sufficiently good tensile strength suitable for certain desirable applications, such as turbine or compressor blades.

However, the novel polycrystalline fibers of this invention possess high tensile strength and high modulus making them suitable for use in reinforcing applications. In addition those fibers having crystal orientation (defined further below) exhibit low dielectric loss making them useful in such applications as in radomes.

Surprisingly, the fibers of this invention do not stick together on firing as most other oxides do and they can be fired on a resilient bobbin. These properties help render the fibers producible as a continuous spun filament. Most ceramic oxide fibers cannot be prepared as continuous strands.

BRIEF SUMMARY OF THE INVENTION

The novel fibers of this invention are polycrystalline ceramic oxide fibers containing at least 60% $Al_2O_3$ and comprising an α-alumina crystalline phase. They are prepared from a spinnable mix containing solid particles (sometimes called "particulate") that are at least 80 percent alumina and an aqueous phase that has dissolved in it at least one precursor of alumina or at least one precursor of an oxide that forms a solid solution with alumina. It has been found that the amount and size of the solid particles in the mix has an effect on the grain size, roughness and orientation of the fibers produced from the mix. The mix is extruded through a spinneret, and the emerging fiber is wound on a collapsible bobbin, usually continuously, and fired, usually in two stages. The result is a strong polycrystalline alumina fiber. It is believed that the presence of the solid particles minimizes filament-to-filament sticking during the spinning and firing steps thus overcoming a problem that has plagued the production of continuous alumina fibers in the past. It is also believed that the presence of the solid particles aids in the firing of the fibers by reducing the amount of shrinkage of the fiber, overcoming another problem that has plagued the production of continuous alumina fiber in the past.

DESCRIPTION OF THE DRAWING

The drawing is a photomicrograph of a fiber of this invention (magnification about 10,000 X) showing the grains of the fiber.

DESCRIPTION OF THE INVENTION

The Spinnable Mix

The spinnable mix comprises solid particles and an aqueous phase wherein:

1. the solid particles are such that
   a. when measured for equivalent spherical diameter, 99.5 percent or more by weight are smaller than about 5 microns, about 98 percent or more by weight are smaller than 3 microns, and about 50 percent or more by weight are greater than 0.2 micron, (preferably 50 percent or more, and most preferably 30 percent or more are smaller than 0.5 micron),
   b. when measured from electron micrographs, none have a dimension less than about 0.005 micron (preferably none less than about 0.02 micron), and
   c. at least about 80 percent by weight of the total particle weight (preferably about 100 percent) is alumina,
2. the aqueous phase has dissolved in it at least one member of the class consisting of at least one precursor of alumina, at least one precursor of an oxide that forms a solid solution with alumina, and a mixture of both,
3. the solid particles provide between about 13 percent and 97 percent (preferably 35 percent and 75 percent, and most preferably 35 percent and 60 percent) by weight of the total available oxide content of the mix, and
4. the amount of alumina available from the solid particles and the precursor of alumina is at least 60 percent (preferably at least 80 percent) by weight of the total available oxide content of the mix.

The total available oxide content of the mix is found by pyrolyzing the mix in air at 900°C. until a constant weight is obtained. Any oxide content not due to the alumina from the solid particles or the precursor of alumina is due to other refractory oxides, e.g., oxides present, usually as impurities, in the solid particles, oxides that form solid solution with alumina, or other oxides resulting from additives to influence spinnability, grain growth, surface characteristics or catalytic activity.

It has been found that the amount of alumina in the small particles, the size of the small particles, and the amount of alumina in fired fibers obtained from particulate in the spinnable mix, all combine to result in a high tensile strength, high modulus fiber which, contrary to most ceramic fibers, is handleable and processible without undue breakage or sticking.

The solid particles must be at least about 80 percent by weight alumina. The remainder may be $SiO_2$ or oxides of metals in Groups IIIB and rare earths, IVB, VB, VIB, VIIB or VIII of the Periodic Table, e.g., Ce, La, Ti, V, Cr, Mo, Mn, Fe, (o, Ni, Pd, and Pt. All these oxides may be particles themselves or may be chemically combined in alumina-containing particles. Oxides of Groups IA and IIA of the Periodic Table may also be present if they are chemically combined with the alumina-containing particles, but the sum of the alkali-metal oxides should be less than 3 percent of the total available oxide content of the mix.

The aqueous phase has dissolved in it at least one precursor of alumina, or at least one precursor of an oxide that forms a solid solution with alumina, or both. Because of the alumina content needed in the fired fiber it is highly preferred that the aqueous phase contain at least one precursor of alumina, and since the solid particles provide between about 13 and 97 percent of total available oxide content, it follows that the amount of the precursor of alumina present or oxide precursor must provide at least 3 percent of the total available oxide content or more depending upon the amount of alumina in the solid particles. Preferred precursors of alumina are the basic aluminum salts, such as aluminum chlorohydroxide, basic aluminum nitrate, basic aluminum chloroacetate, which have a basicity of 0.33–0.83. Aluminum chlorohydroxide is most preferred, and its basicity should preferably be between 0.79 and 0.82. The basicity of the aqueous phase is calculated by dividing the total equivalents of hydroxyl anions by the total equivalents of cations in the aqueous phase. Thus, aluminum chlorohydroxide of the formula $Al_2(OH)_5Cl \cdot 2H_2O$ has a basicity of five-sixths or 0.833. In the spinnable mix, this can be adjusted to between the preferred values of 0.79 and 0.82 by the addition of HCl or $AlCl_3$.

Water-soluble precursors of oxides that form a solid solution with alumina include chromium chloride (which forms $Cr_2O_3$), iron chloride (which forms FeO and $Fe_2O_3$), chromium chlorohydroxide $[Cr_5(OH)_6Cl_9 \cdot 12H_2O]$, and the like. Preferably, such precursors are precursors of chromia.

In addition, to aid spinnability, the spinnable mix can contain up to 5 percent, preferably up to only 1 percent, by weight of the total available oxides of at least one inorganic modifier, such as silicic acid, boric acid, phosphoric acid, zirconyl nitrate, lithium chloride, or at least one viscosity modifier such as high molecular weight poly(ethylene oxide). Preferably the poly(ethylene oxide) will have a viscosity of at least 3000 centipoises at 25°C. in a 5 percent aqueous solution.

To improve the fiber-forming properties of the spinnable mix, the mix may be "aged" to adjust its viscosity. This can be accomplished by heating the mix under ambient pressure using temperatures of about 80°C. If aging is continued until the mix is too viscous to extrude, water may be added. Preferred viscosities for spinning range from about 500 to about 3,000 poises at 30°C. if no viscosity modifier is employed, and from about 500 to about 10,000 poises if a modifier is employed.

For ease of shipment or storage, free water in the mix (i.e., water not combined as in a hydrated salt) can be removed by conventional means. When ready for use, the appropriate quantity of water can then be added.

In those spinnable mixes containing basic aluminum chlorohydroxide it is preferred that the weight percents of the ingredients be regulated according to the equation:

$$Y(\pm 8\%) = 43.4 + 0.395(X-44.1) + 0.00476(X-44.1)^2$$

wherein Y approximates ($\pm 8\%$) the percent by weight of the total available oxides based on the mix, and X represents the percent by weight of oxides derived from the solid particles, based on the total available oxides, the value of X being dependent upon the basicity of the aqueous phase. X will, of course, exhibit a value between 13 and 97 percent. The minimum concentration of X can be selected by interpolation between the following points:

| Basicity of Aqueous Phase | Approximate Lower Limit for X |
| --- | --- |
| 0 | 80 |
| 0.30 | 55 |
| 0.67 | 37 |
| 0.75 and greater | 13 |

The composition and size distribution of the solid phase and/or the types of dissolved precursors employed may affect the rheological behavior of the mix so that it becomes necessary to vary the value of Y within $\pm 8$ percent of the calculated value in order to obtain a mix that is extrudable and fiber-forming under a given set of extrusion conditions. This variation can be accomplished by adding or removing water from the mix.

Thus, by using the above equation with any desired value for X, the appropriate value for Y can be determined, which then allows the weight of water required for a given mix to be calculated.

The Fibers

When the spinnable mix is extruded and processed by firing as described below, a polycrystalline ceramic oxide fiber is obtained comprising at least about 60 percent (preferably 80–100%) by weight $Al_2O_3$, based on the weight of the fiber, at least part of said $Al_2O_3$ being in an $\alpha$-alumina phase, said fiber having 1. at least one dimension less than about 0.01 inch, preferably less than about 0.001 inch,
2. a crystallinity greater than about 85 percent,
3. a porosity of less than about 10 percent, preferably less than 5 percent,
4. a distribution of grain size wherein substantially all the grains are less than about 3 microns in diameter, at least 30 percent of the grains are less than about 0.5 micron in diameter, and at least about 10 percent of the grains are larger than about 0.04 micron in diameter,
5. a microscopic roughness height between about 1,100A and 7,000A and a microscopic roughness period between about 4,000A and 15,000A, and
6. a uniform orientation, as determined by optical birefringence.

As stated above, the fibers comprise at least about 60 percent by weight $Al_2O_3$. The $Al_2O_3$ may be present alone, i.e., substantially pure $Al_2O_3$; in chemically combined form, as in mullite ($3Al_2O_3 \cdot 2SiO_2$); and/or in solid solution with other oxides. The remainder of the fiber, if any, is comprised of ceramic oxides obtained from the non-alumina portion of the solid particles of the spinnable mix or from the precursors of oxides.

Characteristic of the fibers of this invention are a higher tensile strength and a higher modulus than most ceramic oxide fibers. These properties, in addition to the microscopic roughness and uniform orientation, make the fibers ideally suited for reinforcing applications. It is believed that the microscopic roughness characteristics minimize slippage at the fiber-matrix interface during stressing of the fiber-matrix composites. Thus, fiber properties should readily be translatable to the matrix.

One preferred fiber of this invention exhibits crystal orientation, as determined by X-ray analysis. The presence of this crystal orientation, which is in addition to the uniform orientation mentioned above, permits these preferred fibers to be used in applications where low dielectric loss is important such as in the construction of radomes. Composites of aligned fibers of this invention, embedded in epoxy resin, were tested to determine dielectric constant and loss (at $9.3 \times 10^9$ Hz) by known methods, it was found that the loss factor (product of dielectric constant and loss) was 0.0158 for composites with fibers aligned perpendicular to the wave propagation direction, and that this was about half that (0.0316) measured for composites with fibers parallel to the wave propagation direction. Thus, the above described fibers of this invention can be used to construct radome materials with lower loss factors than would be possible using ceramic oxide fibers which do not have the preferred crystal orientation.

In one embodiment of the fibers of this invention, the grains comprise between about 40–90 percent of the fiber and are substantially uniformly distributed throughout a continuous matrix and there is present in addition to the α-alumina crystalline phase at least one crystalline phase selected from the group of mullite and solid solutions containing aluminum oxide and chromium oxide.

Preparing the Green Fiber

The spinnable mix, which is prepared by mixing the ingredients together until the mix becomes homogeneous and reaches the desired viscosity is converted to fibers by a suitable process. Preferably, the mix is extruded (e.g., using hydraulic pressure) through spinneret orifices (e.g., of 2 to 10 mil diameter) to form filaments which are attenuated to a diameter smaller than that of the orifice, e.g., the orifice/fiber diameter ratio may be 5 or more. An air-jet may be used to attenuate the fibers and dry and harden their surface, if desired. Using a mechanical windup, a 0.8 mil diameter as-spun fiber can be spun, for example, from a 5 mil diameter spinneret orifice at a rate of about 250 yards per minute. The as-spun fibers may be wound up using a collapsible bobbin to accommodate lengthwise contraction that accompanies the drying process.

The rate of lengthwise contraction of the as-spun fibers may be reduced by application of a suitable finish (e.g., 20 percent solution of ethyl laurate in perchloroethylene of a 20 percent solution of paraffin wax in toluene).

The "green fiber," i.e., the extruded filament prior to any firing, contains articles comprising alumina embedded in a phase containing the oxide precursor or the alumina precursor. These green fibers are stable under dry atmospheric conditions and may be stored prior to being fired without a substantial decrease in fired-fiber properties. The green fiber may be used, e.g., as a reinforcing agent in "green" ceramic materials; the firing being in situ.

Preparing the Final Fiber

Conversion of the green fiber to the final fiber is accomplished by either single or multiple stage firing; but to develop maximum strength, the fibers should be subjected to a two-stage firing.

In the two-stage procedure the first stage or step serves to remove volatile material from the fiber, while the second stage serves to crystallize the fiber and convert alumina from the precursor to α-alumina, thus strengthening the fiber. In the first, or low firing stage, the temperature is generally raised from ambient temperature to between about 350° and 600°C. over a period of between about 45 minutes and two hours and held there for from one minute to two hours, preferably for one to two hours. When the temperature is in the lower end of the range, longer times may be used. In the second stage, the fiber is either heated on up (a) to between 1300° and 1500°C., preferably for one-half to 2 hours, but shorter times, e.g., 2 minutes can be used; or (b) is backwound through the flame of a propane-air or oxygen torch with each segment of the fiber residing in the flame for up to no more than about 5 seconds, but preferably between about 0.5 to 3 seconds, or (c) a combination of (a) followed by (b). The backwinding through the flame is preferred. Long periods of exposure to high temperatures tend to provide undesirable grain growth. The temperature of the flame will be between about 1300°C. and 1500°C. as measured by an optical pyrometer with no correction for emissivity.

In the single stage procedure the fiber is heated gradually from ambient temperature to 1300° – 1500°C. over about 12 hours, and maintained at this temperature for about 2 hours. This single stage procedure is less preferred than the two stage because it takes more time than the multistage procedure.

A preferred detailed embodiment of the two-stage process is to employ a spinnable mix of alumina particles prepared as described below under the section describing the preparation of "Type A particles." These particles provide about 60 percent of the total available oxides. An alumina precursor of aluminum chlorohydroxide of basicity 0.82 and water are provided in amounts such that the total available oxide content of the mix (i.e., both the precursor and the particles) is about 52 percent. Small amounts of magnesium chloride and hydrochloric acid are also added. These ingredients are mixed and the viscosity of the mix adjusted to between about 900–1000 poises at 26°C. The mixture is spun continuously into fibers from a spinning cell and the fibers attenuated and wound on a collapsible, i.e., resilient, metal bobbin, all as described in detail in Example 8. The fibers are then low-fired by placing them in a heated oven (usually a muffle furnace) at room temperature or at least below 100°C., and raising the temperature to between about 500°–600°C., and usually about 550°C., over a period of about 1½ hours, and holding it there for about 45° minutes. The fibers are then passed through the second stage by backwinding them from the bobbin through a propane-oxygen flame and through an insulated chimney to a wind-up. Each segment of the fiber remains in the flame for about one second, and the apparent temperature of the flame is about 1,450°C. (as measured by an optical pyrometer with no correction for $Al_2O_3$ emissivity). The true temperature could be about 200° to 400°C. higher.

The fiber obtained, which is the preferred fiber of this invention, contains about 100 percent α-alumina, about 60 percent of which is derived from the Type A solid α-alumina particles and about 40 percent of which is derived from the aluminum chlorohydroxide.

It is believed that the solid particles in the spinnable mix surprisingly cause a minimization of the tendency of ceramic oxide fibers of this invention to stick together during spinning and firing, thus enabling the fibers to be fired on a bobbin and subsequently be backwound from the bobbin.

It is also believed that the solid particles aid in firing the fiber by reducing the amount of shrinkage of the fiber. For example, fibers containing 60 percent α-alumina derived from Type A alumina particles and fibers containing no α-alumina derived from solid particles, after conditioning and firing to 1,240°C. for two minutes in an oven followed by passage through a propane-air torch flame above 1,300°C. had the following linear shrinkage: 15.2 percent for the fiber derived from solid particles; 33.3 percent for the other fiber. High shrinkage is thought to be partly responsible for unevenness and nonuniformity of fiber structure in known ceramic oxide fibers, and for curling, which results in fiber breakage.

For some applications such as filament-wound reinforced plastics and weaving, it may be advantageous to apply a sizing (e.g., starch) or a finish (e.g., a solution of gamma-amino propyl triethoxy silane) that will adhere to the filaments and be compatible with resins applied subsequently.

TESTS

The Fiber
  Porosity
  % Crystallinity
  Grain Size and Size Distribution
  Matrix Phase
  Tensile Properties
  Microscopic Roughness Height and Period
  Uniform Orientation (Optical Birefringence)
  α-alumina crystal Orientation (X-ray)
The Particles
  Equivalent Spherical Diameter

TEST PROCEDURES

Porosity of the fiber is calculated using the following equation:

$$\text{Percent Porosity} = \frac{\text{Apparent Density} - \text{Bulk Density}}{\text{Apparent Density}} \times 100.$$

The apparent density is obtained using an air pycnometer and a sample size of about 0.1 g. Prior to being evaluated the fiber is fired for two minutes at 1,500°C. The fiber is then pulverized using a mortar and pestle to produce lengths that are no more than five times the average fiber diameter, thereby minimizing any closed void content in order to obtain an apparent density value which closely approximates or equals the true density of the sample.

The bulk density is the weight of the fiber divided by the (area of section X fiber length). The fibers are straightened in a propane-air flame for bulk density measurements in order that fiber length can easily be measured. Fiber lengths are measured using a microscope equipped with a micro-meter and noting the displacement required to scan the entire length of the sample. The diameter of round fibers is measured with a precision of $2.5 \times 10^{-4}$ mm. using a microscope fitted with a filar eyepiece. The area of noncircular cross-sections is measured using photographs of fiber ends. Fibers are weighed on a balance capable of weighing accurately to $1 \times 10^{-7}$ gm. using a minimum sample of $1 \times 10^{-5}$ gm.

The percent crystallinity of the fiber is determined using the technique described by H. P. Klug and L. E. Alexander in "X-Ray Diffraction Procedures for Polycrystalline and Amorphous Materails," pp. 626–633, published by John Wiley & Sons, Inc., 1954. A suitable modification of this technique which is used to determine the amount of α-alumina crystallinity present in the preferred 100 percent α-alumina fibers of the invention is as follows (this procedure with proper calibrations, is applicable to all fibers of this invention):

A calibration curve for percent crystallinity versus X-ray intensity is obtained as described below.

Mixtures of α-alumina (100 percent crystalline) and glass (0 crystalline), both passing 325 mesh, are prepared containing 10 and 20 percent of the glass and homogenized using a mortar and pestle. The X-ray intensity for these mixtures and for 100 percent α-alumina is determined on an X-ray diffractometer equipped with a wide range goniometer, copper Kα radiation, a nickel β filter, ½° divergent and scatter slits, scintillation detector, and pulse height analyzer. The total amount (i.e. integrated) of diffracted intensity ($I_A$) from 12.00° to 45.33° (2θ) and the intensity ($I_B$) from 37.00° to 40.33° (2θ) is obtained using standard counting procedures as the sample is rotated at a rate of 2° (2θ) per minute, all analyses being carried out in duplicate. The intensity ratio $I_A:I_B$ is then calculated and plotted versus the percent crystalline material in the sample; the best straight line is drawn through the data points.

The same intensity ratio is measured for each of the fiber samples after they are ground to pass a 325 mesh screen and the percent crystallinity is then obtained from the previously determined calibration curve.

The grain size and size distribution on the longitudinal surface of the fired shaped articles is determined from an enlarged electron micrograph following an extension of the method of John E. Hilliard described in "Metal Progress," May 1964, pp. 99–102, and of R. L. Fullman, described in the "Journal of Metals," Mar. 1953, p. 447 and ff.

A photomicrograph, so prepared, enlarged about 10,000 fold, of a fiber within the scope of this invention is shown in the attached drawing.

The etching and replication must be such that the electron micrograph permits one skilled in the art to distinguish the grains on the surface of the shaped articles. If grains are not visible on the as-fired shaped article, an etch may be necessary to reveal the grain structure. The etch should reveal the grains while not substantially affecting the grains themselves. As an example, alumina fibers made with oxide particles containing silica may be etched for 30 minutes in concentrated (48%) hydrofluoric acid at room temperature. Standard electron microscope procedure is used to obtain electron micrographs, i.e., carbon is deposited directly on the platinum-shadowed etched (or unetched) fibers in a bell jar evaporater and the fibers are completely dissolved (hot phosphoric acid at about 350°C. being used for alumina fibers) from the carbon replica, which is washed and examined on the electron microscope. A representative area is photographed at about 2,500 fold magnification. The negative is then enlarged to produce a photomicrograph that exhibits 20,000 fold magnification.

Three or four circles each having a radius of 6.4 centimeters, are then drawn in different areas of the 20,000 X enlarged micrograph so that a total of at least 100 grains are intersected by the circumferences of all the circles.

The intersections of the circumference with each grain boundary intersecting the circumference are marked on all circles.

The length of the chord corresponding to the arc indicated on the circles for each of the grain intersections is measured and the measured lengths are tabulated in the following fractions: 1–2 millimeters, 2–4 mm., 4–8 mm., 8–16 mm., 16–32 mm., and 32–64 mm.

The average chord length, $d_{(m)}$, for each of the size fractions can be calculated by dividing the sum of the chord lengths for the size fraction by the number of grains measured in the size fraction and converting to actual dimensions in the sample in angstroms. This is converted to average grain diameter, $d_{(a)}$ by the formula of Fullman:

$$d_{(a)} = (\pi/2) \, d_{(m)}.$$

The average grain diameter and the percent of grains in each size fraction for a typical alumina fiber of the examples follows: 0.16 $\mu$(2%), 0.31 (11%), 0.47 (51%), 0.86 (34%), 1.57 (3%), greater than 1.6 $\mu$(0%).

It is observed that when the size distribution data for aluminum oxide filaments of the invention are plotted as cumulative % vs. average grain diameter using log-normal probability paper, (probability and logarithmic scales, the former based on the normal law of error), the points between 10 and 98 percent approximate a straight line. The grain size values used in the definition of the limits of this invention are read from the above straight line plot (between 10 and 98 cumulative percent) for the sample.

Tensile Properties

Tensile strengths are measured at ambient room conditions using a method by R. D. Schile et al. in "Review of Scientific Instruments," 38 No. 8, Aug. 1967, pp. 1103–4. The gauge length is 0.04 inch and the crosshead speed is between 1 and 4 mils/min.

Elastic moduli (flexural modulus) are measured by vibroscope techniques as described in J. Applied Physics, Vol. 26, No. 7, 786, 792, July 1955.

The microscopic roughness height and period of the filaments are obtained by measuring the height and spacing, relative to the adjacent fiber surface, of protrusions observed on a magnified silhouette of the longitudinal filament surface. The fibers are placed on copper grids using standard electron microscope procedures for viewing solid objects in transmission and photographed at 1500X or 2500X magnification. Photographic enlargements of the silhouettes are then made to obtain a final magnification of 6000X or greater.

A straight edge is laid along the edge of a representative portion of the fiber surface, i.e., ignoring occasional atypical protuberances which may be due to dirt, in the micrograph so that fiber surface image equivalent to 90,000 A in the fiber (i.e. 54 mm. at 6000X) lies adjacent the straight edge. To obtain roughness period, one counts the number of peaks in the 90,000 A equivalent length, repeating this for three separate representative sections. Then one converts the values obtained to microscopic roughness period expressed as average distance in A between peaks.

Microscopic roughness height is determined as follows. A straight edge is placed on the same micrograph adjacent any representative surface equivalent to 50,000 A on the fiber so that the edge just touches at least the two tallest peaks. The maximum distance from the straight edge to the deepest valley in this section is measured. This is repeated 3 times on separate representative sections. The three numbers are averaged arithmetically and the average, expressed in A, is the microscopic roughness height.

Uniform orientation is determined as follows: Fibers are immersed in a 1.76 refractive index immersion oil and observed under crossed polars in a polarizing microscope with the Gypsum ("Red One") plate inserted. The specimen is rotated from the +45° to the −45° or the −45° to the +45° position and the changes of color of the specimen upon rotation are recorded. For a fiber to exhibit uniform orientation, the filament must show a uniform change of color from yellow to blue or blue to yellow along its length upon rotation of the specimen. A nonuniform change in color (regions of yellow and blue changing to blue and yellow) does not meet the criteria set for this analysis. For samples with poor transmission properties, the criteria are still met if the filament edges (where good transmission occurs) clearly exhibit the necessary uniform color changes. Filaments without clear distinct color changes do not meet the criteria. The fibers of the following examples were examined in this way and show uniform orientation: 1, 2, 4a, 4d, 5b, 5e, 7a, 8b, 9, 10a and 12. Fibers made from mixtures containing too little (comparative example 5f) or no solid particles (comparative examples 7b and 10b) do not show uniform orientation.

α-Alumina Crystalline Orientation: X-ray Determination

Two different sample mountings are required to determine if there is crystal orientation in the fiber. The mounting procedures are:

1. Flat mounting: Fibers are placed in a holder so that the fiber axes are parallel to the X-ray beam when the diffractometer is at 0° 2θ with their ends pointing toward the tube and detector.

2. End mounting: A thick parallel bundle of fibers is embedded in epoxy; 3 mm. sheets are cut therefrom perpendicular to fiber axis and placed in aholder or a bundle of aligned fibers is placed directly in a tubular holder. In either case the samples are aligned so that the fiber axes are perpendicular to the X-ray beam when the diffractometer is at 0° 2θ.

Diffractometer scans are made for each sample preparation from 66° to 70° and 75° to 79° 2θ using the X-ray equipment described in the percent crystallinity test but at a scanning speed of 1° 2θ/minute, chart speed of 1 inch/minute, time constant of 2 and recorded range set at one value so that both peaks [(030) and (1.0.10) respectively] will be on scale. A base line is drawn below each peak and the height of the peak above the background is determined. A ratio of the peak intensities [(030)/(1.0.10)] is calculated for the two scans.

Crystal orientation is present in the fiber if the intensity ratio [(030)/(1.0.10)] of the flat mounting differs from the intensity ratio [(030)/(1.0.10)] of the end mounting by at least 1.0 unit.

Results for typical examples are given below:

| Ex. | Mounting | Intensity Ratio [(030)/(1.0.10)] | Units Difference |
|---|---|---|---|
| 4c | Flat | 1.9 | 1.3 |
|  | End | 3.2 |  |
| 1 | Flat | 2.5 | 1.7 |
|  | End | 4.2 |  |
| 8b | Flat | 2.0 | 4.6 |
|  | End | 6.6 |  |

The results, wherein the flat mounting value is less than the end mounting value, indicate that the c axes of the α-alumina crystals tend to be in a plane perpendicular to the fiber axis.

The equivalent spherical diameter of the solid oxide particles is determined using an Andreasen pipette in accordance with a procedure described by G. A. Loomis in the "Journal of the American Ceramic Society," Volume 21, page 393 ff.

This method requires 96 hours for particles with an e.s.d. of 0.5 and larger to sediment from the approximately 1 volume percent dispersion used. Due to the time needed and other considerations, it is not practical for separation of particles smaller than 0.5 $\mu$.

The Sedigraph 5000 Particle Size Analyser (made by Micromeritics Instrument Corporation of Norcross, Georgia) uses the same principles as the above method but yields a cumulative percent distribution of particles with e.s.d. of from 100 $\mu$ to about 0.1 $\mu$ in minutes. Analyses of typical Type A particles (see page 23) by this method at about a 2 volume percent concentration shows that about 65 to 75 weight percent of the particles have an e.s.d. of 0.2 $\mu$ or larger and that about 99 percent of the particles are smaller than an e.s.d. of 2.2 $\mu$. The Sedigraph may be used to determine the percent of particles larger than 0.2 micron.

The fibers described in this application may be incorporated into fabrics or batting that are useful as insulation or filtration media and for high temperature applications. The fibers are useful as reinforcing agents for plastics, textile fibers, metals, ceramics, and other materials. The unfired and prefired fibers also have utility (e.g., they can be incorporated into ceramic bodies and converted in situ to ceramic oxide fibers which reinforce the fired bodies).

EXAMPLES

In the following Examples all parts are by weight unless otherwise indicated.

Properties of fibers for the Examples are listed in Table I. In the Examples, alumina oxide particles are referred to as Types A, B, or C depending on how the particles were prepared, as follows:

Type A Particles

"Type A" is used to designate particles prepared by fractionating XA-16 alumina in accordance with the following procedure:

9.81 Kg. of a commercially available high purity finely ground alumina (about 99.7% $Al_2O_3$, with major impurities being 0.08% $Na_2O$, and 0.05% each of $SiO_2$, CaO and MgO) sold as "XA-16" by Aluminum Co. of America is dispersed by high speed stirring in 42 liters of distilled water containing about 84 ml. of concentrated hydrochloric acid to adjust the pH to 4.0. This crude dispersion is placed in a polyethylene tank which is filled to a depth of 19 cm. and allowed to set undisturbed for 24 hours. The supernatant dispersion is withdrawn from the settled solids by means of an outlet located about 1 inch above the bottom of the tank. This dilute, refined dispersion is concentrated by distillation at atmospheric pressure to give a dispersion containing about 40 to 75 percent solids referred to as Type A particles. The particle size distribution of this batch is as follows: 100 percent of the particles by weight are smaller than an equivalent spherical diameter (hereafter "e.s.d.") of 5 $\mu$, 99.8 percent are smaller than an e.s.d. of 3 $\mu$, 99.4 percent of the particles are smaller than an e.s.d. of 1 $\mu$ and 89.4 percent by weight are smaller than an e.s.d. of 0.5 $\mu$, said particles having no dimension less than 0.02 $\mu$ as measured from electron micrographs. The particles are substantially (about 100%) α-alumina as determined by the crystallinity test.

Type B Particles (Milled Burundum)

Type B particles are obtained by ball-milling "Burundum" grinding cylinders and water in a "Burundum"-fortified porcelain jar until the distribution of particle size is within the desired limits. The porcelain jar should exhibit a substantial aluminum oxide content to minimize contamination of the product. "Burundum" has the following approximate composition by weight: as free or combined oxides furnished by the manufacturer, U.S. Stoneware, Akron, Ohio.

$Al_2O_3$—85–88 percent
$SiO_2$—8–11 percent
CaO—1.2 percent
MgO—2.0 percent
Alkali metal oxides—0.6 percent
Iron oxide—trace
$TiO_2$—trace Particles are prepared by placing 4,000 grams of 0.81 inch-diameter "Burundum" grinding cylinders, together with 1000 cc. of water in a 1.3 gallon-capacity mill jar ("Burundum-fortified" porcelain) which is then rolled at about 38 rpm for about 30 days. The resulting suspension is dried to yield from 250–400 grams of high alumina content particles.

A typical useful particle size distribution after milling above is as follows: All particles are smaller than those exhibiting an (e.s.d.) of 5 microns, 99+% by weight of the particles are smaller than those exhibiting an e.s.d. of 3 microns, at least 75 percent by weight of the particles are smaller than those exhibiting an e.s.d. of 1 micron, 50 percent by weight of the particles are smaller than those exhibiting an e.s.d. of 0.5 $\mu$. The particles have no dimension, as measured from electron micrographs less than about 0.02 $\mu$.

Type C Particle (From Reynolds RC–152 DBM)

Type C particles are obtained by fractionation of commercial alumina designated Type RD–152 DBM sold by Reynolds Metals Co. to obtain the desired particle size. A typical fractionation is as follows:

2.2 Kg. of the as-received alumina, 11 liters of distilled water and sufficient concentrated (37.5 percent by weight) aqueous hydrochloric acid to obtain a pH of 4.0 are stirred vigorously for 10 minutes then left to settle undisturbed for 6 hours in a polyethylene tank having a diameter of 28 cm. The upper 17 cm. of liquid are then siphoned off. This dilute dispersion is concentrated under atmospheric pressure to obtain 2 liters of a dispersion having a solids content of 39.1 percent. The particle size distribution of this particulate is as follows:

| | | |
|---|---|---|
| 99.8% | smaller than | 18.4 μ equivalent spherical diameter |
| 99.5 | do. | 5.2 |
| 99.2 | do. | 3.6 |
| 98.9 | do. | 2.9 |
| 97.7 | do. | 2.2 |
| 49.3 | do. | 1.0 |
| 28.9 | do. | 0.7 |
| 17.4 | do. | 0.5 |

Firing Cycles

The firing cycle (or cycles) employed to prepare given samples is (are) listed below. Each Example will specify what combination of cycles were employed by referring to a sequence of the letters below. The cycles are designated by letter as follows:

A — 1 minute at 350°C.

B — Temperature raised from ambient to 600°C. over 45 minutes, then allowed to cool to ambient temperature.

C — Temperature raised from ambient to 600°C. over one hour, then allowed to cool to ambient temperature.

D — Temperature raised from ambient to 873°C. over two hours and maintained for ten minutes.

E — Each segment of filament resides in propane-air flame for one or two seconds.

F — Filaments are passed through a 36-inch (92 cm.)-long tube furnace wherein a 6-inch (15 cm.)-long zone located midway along the length of the tube is heated to a temperature of 1400°C. and both ends of the tube open to the environmental atmosphere. The filaments are passed through the furnace at a constant rate of speed such that their residence time in the 1400°C. zone is one minute.

G — Same as F, except that residence time in the 1400°C. zone is two minutes.

H — Same as F, except for hot zone temperature of 1500°C.

J — Same as G, except that the hot zone temperature is 1500°C.

K — Same as F except that the residence time is 3 minutes at 1500°C.

Z — Filaments passed through a tunnel furnace having an 8 inch × 8 inch × 27 inch long cavity, heated so that a 6 inch long zone located near the middle of the oven is at 650°C., at a speed such that the filaments are in the 650°C. zone for 6 minutes.

A spin finish comprising a 20 percent by weight solution of ethyl laurate in perchloroethylene is applied by passing the as spun filaments (prior to windup) over a wick that is partially immersed in the spin finish in Examples 4a, 4b, 4c, 4d, 5e, 5f, 7, 8, 9 and 10.

The spin mixes described in the Example and the fibers prepared from the mixes all fall within the scope of the mixes and fibers defined in the Description of the Invention, except where labelled for control comparison purposes.

EXAMPLE 1

A spinnable mix is prepared by combining 66 grams of Type B alumina, 434 g. of a 50 percent aqueous solution of aluminum chlorohydroxide complex ([$Al_2(OH)_5Cl \cdot 2.2H_2O$], sold by Reheis Chemical Co.) and 20 grams of solid chromium chlorohydroxide [$Cr_5(OH)_6Cl_9 \cdot 12H_2O$], available from Diamond Alkali Co.]. This mixture is placed in a one quart "Burundum-fortified" jar which contains 600 grams of "Burundum" cylinders. The jar is rotated for 17 hours at about 120 rpm, the resulting fluid mixture is decanted and about 253 grams of this mixture is concentrated in a rotating flask to obtain a 40.4 gram weight loss, which requires about 16 minutes at 80°C. under reduced pressure. This spin mix has X and Y values of 37.5 and 41 respectively. The basicity of the aqueous phase is 0.81. This mixture is aged for 20 minutes at 80°C. at atmospheric pressure while rotating in a closed flask and then permitted to cool to 40°C. The system is then extruded through a 0.028 inch-long orifice having a diameter of 0.004 inch. Upstream from the orifice the system is filtered by successively passing through 5 screens. The screens are arranged in the following order of Tyler series mesh sizes: 50, 325, 50, 200, 50.

The fiber is allowed to drop through air at ambient temperatures onto a bobbin which collects the fiber at a rate of 640 ft./min.

The fiber is fired under conditions A and K. The diameter of the fiber is 0.00087 inch. The sole crystalline phase detected by X-ray diffraction is α-alumina, and the density of the fibers is 3.7 g./cc. The fibers are over 60 percent $Al_2O_3$. As observed under the electron microscope the fibers comprise grains distributed throughout a continuous matrix. Other properties of the fiber are given in Table I.

EXAMPLE 2

An extrudable system is prepared by dissolving chromium chlorohydroxide [$Cr_2(OH)_6Cl_9 \cdot 12H_2O$] (50 g.), in 100 g. of a 50 percent by weight aqueous solution of aluminum chlorohydroxide. The resultant clear solution is combined with Type B alumina particles (250 g.) and 250 cc. of water in a "Burundum-fortified" jar containing 1,000 grams of "Burundum" cylinders and milled for about 16 hours. The resultant slurry is poured off and concentrated (about 33.3 percent weight loss) under reduced pressure in a rotating flask on a steam bath to a consistency (thick paste) exhibiting optimum extrudable properties. The spin mix has X and Y values of 85 and 68 respectively. The basicity of the aqueous phase is 0.65.

The freshly prepared spin mix is extruded downward through a 2 mil-diameter spinneret orifice under a pressure of about 1,000 psi using a Carver hydraulic press. The pressure is gradually increased to the final value until a fiber emerges. The end of the alumina fiber is picked up on a spatula and pulled away from the spinneret by hand at a rate which affords an average attenuation ratio (orifice/fiber diameter) of about 3:1 yet avoids breaking of the fiber. The fiber after firing under conditions B and H has a crystallinity of 85 percent, and a diameter of 2.51 mils.

EXAMPLE 3 a. An extrudable system is prepared by mixing eight grams of Type B alumina particles (hereafter B) in a beaker with 2.7 grams of an aqueous solution of chromium chloride hexahydrate (about 50 percent by weight). The resultant thick paste is transferred to a finger of a rubber glove. The open end is tied off with a rubber band and the contents kneaded by rolling the container along a counter top for two minutes while exerting pressure using the palm of the hand. No concentration of the mix is required as the system already exhibits near optimum fiber-forming properties. The spin mix contains 75% B, and 7 percent chromium chloride (CrCl₃) with X and Y values of 95.5 and 78 respectively. A fiber is extruded under a pressure of about 2,000 psi using a 5.4 mil-diameter orifice. The emerging fiber is pulled away using a spatula at a rate sufficient to obtain an attenuation ratio of about 3:1 without breaking the fiber. After drying in air until the surface is no longer tacky, the fiber is fired under conditions B and H (plus E for tensile sample). The fiber diameter is 4.70 mils. Other properties are given in Table I.

b. The above procedure is repeated using aluminum chloride in the spin mix (71.5% B, .0% AlCl₃, X of 95.5, Y of 75). After firing under conditions B and H, the fibers have a crystallinity of 85 percent with a maximum grain size of 1.6 micron, 83 percent of the grains being smaller than 0.5 and 90 percent being larger than 0.19 micron. The fiber diameter is 3.58 mils.

c. The above procedure is repeated with a spin mix containing TiO₂ particles (49% B, 21% TiO₂, 2 percent boehmite and 9% AlCl₃, X of 95, Y of 76) to obtain strong useful fibers (65% Al₂O₃, 28% TiO₂, 7% SiO₂) after firing under conditions G and E. The fiber has a diameter of 3.95 mils, a maximum grain dimension of 1.34 μ. All the grains are smaller than 0.5 micron, and 90 percent are bigger than 0.12 micron.

d. The above procedure is repeated with zirconium oxide particles in the spin mix (53% B, 23% ZrO₂, 5% boehmite, 7% AlCl₃ X of 96, Y of 79) to give strong, useful fibers (64% Al₂O₃, 29% ZrO₂ and 7% SiO₂) after firing under conditions G and E. The fiber has a diameter of 2.09 mils and a maximum grain dimension of 1.47 micron. 87 percent of the grains are less than 0.5 micron, and 90 percent are bigger than 0.16 micron.

EXAMPLE 4

This example illustrates the preparation of alumina fibers using substantially pure alumina and aluminum chlorohydroxide.

a. A mixture comprising 265.6 g. of an aqueous dispersion that contains (48.7%) by weight of Type A alumina and 359 g. of the aluminum chlorohydroxide solution of Example 1 is concentrated under reduced pressure (33.3 percent weight loss) to give a mix containing 31.2 percent Type A alumina (hereafter "A") and 43.1 percent of Al₂OH₅Cl·2.2H₂O (hereafter Al-1). After aging the system at 80°C. for 20 minutes it is extruded through eight 4 mil-diameter spinneret orifices to form fibers which were fired under conditions B and J. Fiber diameter was 0.66 ml. The fiber exhibited optical orientation. Other properties are shown in Table I.

b. A spin mix is prepared as above but containing 14.5% A and 54.5% Al-1. The aged mix is extruded as in Example 1 to give fibers. After firing under similar conditions to above, fibers having a diameter of 0.60 mil are obtained.

c. The procedure of b is followed to prepare fibers from a spin mix containing 4.7% A and 60.8% Al-1. After firing under conditions B and J, the fibers have a diameter of 0.52 mils, a microscopic roughness of 1,830A with a period of 8,200A, uniform orientation and crystal orientation.

d. The above procedure is followed to prepare a spin mix containing 43.8% Al-1 and 31.4 percent of Type C alumina particles (about 1 percent exhibit an e.s.d. of greater than 3 microns). After aging 20 minutes at 80°C. the spin mix is extruded as in Example 1. After firing under conditions B and J the fibers have a microscopic roughness of 6,520A with a period of 7,450A.

Fibers a, b, c, and d have porosities of 5, 4, 9, and 10 respectively; crystallinities of from 92 (b) to 98 (a), maximum grain diameters of from about 1.6 to 1.7 microns with from 59 (c) to 79 percent of the grains being less than 0.5 microns and only 10 percent of the grains being less than from 0.13 to 0.27 microns.

e. The above procedure is followed to prepare a spin mix containing 41.3% A and 37.5% Al-1 with an X value of 70 and a Y value of 59.2 which is aged 9 minutes at 80°C. and extruded through a 4.5 mil diameter orifice. The fiber is wound up at 700 feet/minute. After firing under conditions B, J and E the fibers have a diameter of 1.08 mils.

All of the above spin mixes have a basicity of about 0.83 for the aqueous phase. Following are the spin mix parameters and tensile strengths of the fired fibers:

|   | X | Y | tensile strength psi |
|---|------|------|---------|
| a | 60.2 | 51.5 | 167,000 |
| b | 37   | 40.6 | 152,000 |
| c | 14   | 33.7 | 60,000  |
| d | 60.2 | 52.3 | 38,000  |
| e | 70   | 59   | 155,000 |

EXAMPLE 5

This example illustrates process variables in preparation of fibers from alumina particles and various oxide precursors.

a. A mixture comprising 50 grams of Type B alumina (hereafter B), 25 grams of solid chromium chlorohydroxide (hereafter Cr-1), 67 grams of the aqueous solution of aluminum chlorohydroxide of Example 1 and 50 cc. of water containing 1 gram of zirconyl nitrate (as a spinning aid) is prepared following the procedure described in Example 2. The slurry is evaporated under reduced pressure to an extrudable consistency, extruded and the resultant fiber attenuated by pulling it away from the spinneret using a spatula. The fibers are fired under condition G with additional heating at H for crystallinity sample and H and E for tensile sample. They have a diameter of 0.97 mils. Some properties of the fiber are shown in Table I.

b. An aqueous spin mix containing 20.6% B, 42.2% Al-1, 5% Cr-1 and about 6.9% HCl (as 100% HCl) is prepared, aged and extruded through a 0.004 inch diameter orifice to yield fibers with a diameter of 0.58 mil after firing under conditions B and F.

c. A spin mix similar to b containing 21.3% B, 47.2% Al-1 and 7.8 percent ferric chloride hexahydrate (in place of Cr-1 and HCl of b) is prepared, aged 20 minutes at 80°C. and extruded through spinneret having eight 4 mil diameter orifices (50 mils long) and the fibers collected at about 485 feet/minute. After firing under conditions B, H and E, 0.7 mil diameter fibers are obtained.

d. A spin mix containing 14.7% B, 48.4% Al-1 and 4.5 percent nickel nitrate was obtained by rotating the initial aqueous dispersion in the jars of Example 1 for 16 hours at about 71 rpm and concentrating under reduced pressure. The spin mix is extruded through a 5 mil diameter orifice and the fiber wound up on a bobbin at a rate to give an orifice/fiber diameter ratio of about 3.5. The fiber is fired under conditions B, H and E to give a 1.1 mil diameter fiber. X-ray diffraction patterns show the presence of α-alumina and $NiAl_2O_4$ crystal phases in the fiber.

e. A spin mix containing about 4.6% B, 59.6% Al-1, 4.5% HCl (100%) and 4.0% Cr-1 is prepared, aged and extruded to 0.36 mil diameter fibers using the spinning procedures of Example 1 and firing with conditions B, F and E.

All five of the above fired fibers have porosities of 3 or less. Fibers a, c and d have crystallinities of 90, 87 and 90 percent respectively. Fibers b–e have maximum grain size of from 0.21 (e) to 1.7 microns (c), with from 64 (c) to 100% (b and e) of the grains being less than 0.5 micron and 90 percent of the grains being larger than 0.04 micron.

f. A spin mix containing only 2.1% B, 62.7% Al-1 and 4.0% Cr-1 is made (for comparative purposes to show the effect of a low X value) and extruded as in Example 1. After firing with conditions B, F and E the 0.88 mil diameter fiber has a porosity of 11, and a microscopic roughness of only 960A.

Parameters of the spin mixes and the tensile strength of the fired fibers are given below:

|   | X | Y | Basicity of Aqueous Phase | Tensile Strength psi X $10^{-3}$ |
|---|---|---|---|---|
| a | 66 |  | 0.68 | 179. |
| b | 48 | 42.8 | 0.67 | 96. |
| c | 46 | 41 | 0.77 | 140. |
| d | 35.7 | 47 | 0.80 | 103. |
| e | 13.2 | 34.8 | 0.74 | 158. |
| f | 6.1 | 33.6 | 0.82 | 32. |

The fibers all contain at least 79% $Al_2O_3$, about 0.6 to 6.5% $SiO_2$ and the additional oxides: a, 14% $Cr_2O_3$, 0.6% $ZrO_2$; b, 5% $Cr_2O_3$; c, 5% $Fe_2O_3$; d, 4.6% NiO; e, 5.0 % $Cr_2O_3$ and f, 5.0% $Cr_2O_3$.

EXAMPLE 6

A mixture comprising 16.0 g. of an aqueous dispersion that contains 48.1% Type B alumina and 219.5 g. of an aluminum chlorohydroxide solution having an Al/Cl ratio of 1.34 (basicity = 0.75) is concentrated under reduced pressure to obtain a 34 percent weight loss [5% B, 64.3% Al-1 and 4.8% of HCl (100%), X of 14, Y of 35.5]. After aging the spin mix 20 minutes it is extruded through a 4 mil diameter spinneret orifice. The windup speed is 875 fpm. The resultant fibers are fired using procedures B and F. The filaments have a tensile strength of 66,000 psi and a diameter of 0.45 mils. Microscopic roughness is 2,400A, the microscopic roughness period is 14,300A. Other properties of the fiber are shown in Table I.

EXAMPLE 7

This example illustrates the preparation of an alumina fiber using a basic aluminum acetate solution in combination with aluminum chloride and magnesium chloride with alumina particles in part (a) and a comparison with a control system which omits the alumina particles in part (b).

a. 2800 g. of the aluminum chlorohydroxide solution described in Example 1 is dissolved in 26 liters of distilled water and treated with 480 cc. of concentrated aqueous ammonium hydroxide solution (about 29% $NH_3$). The resulting gel is dispersed by stirring, after which it is centrifuged in a clothlined basket centrifuge. The filter cake is washed four times with distilled water. The damp gel is dissolved in 481 g. of glacial acetic acid to give a solution which contains the equivalent of 6.6 percent by weight of $Al_2O_3$. The Al/acetate molar ratio is 1.

600 g. of the above solution, 54.5 g. of an aqueous aluminum chloride solution containing the equivalent of 27.8% $AlCl_3$, 61.8 g. of Type A alumina and 2.8 g. of magnesium chloride hexahydrate is mixed in a household food blender, evaporated to a 70.8 percent weight loss under a pressure of 85 mm. of mercury in a 75°C. bath and aged 20 minutes under atmospheric pressure in the same bath. The spin mix has X and Y values of 36.8 and 39.1 respectively and the basicity of the aqueous phase is 0.62. The resultant system is extruded through a 4 mil diameter orifice. After firing under conditions C and E the 0.6 mil diameter fiber has a tensile strength of 218,000 psi.

b. As a comparison, omitting the oxide particles, the same basic aluminum acetate solution (600 g.) is combined with 54.4 g. of a 27.8 percent by weight aqueous solution of aluminum chloride and 2.8 of magnesium chloride hexahydrate concentrated (73.2 percent weight loss) aged and extruded as above using the procedure.

After firing under similar conditions (B and E) the fibers with a diameter of 0.71 mils have a tensile strength of 80,000 psi, and a microscopic roughness of only 267 angstroms.

Samples of fiber 7a used for determining the crystallinity, grain size and roughness values shown in Table I are fired under conditions D and H.

EXAMPLE 8

This example illustrates preparation of a yarn of continuous alumina filaments.

a. Into a 2-liter mixing vessel 1180 grams of a 73.8 percent by weight slurry of Type A alumina (100 percent having an e.s.d. below 2 microns) are added. To this, 410 grams of $H_2O$ and 30 grams of concentrated HCl are added, the vessel is sealed and placed in an 80°C. bath and stirred at slow speed with a helical ribbon impeller. Then 15 grams of $MgCl_2 \cdot 6H_2O$ are added and the mix is again stirred for 30 minutes. Then the mixing speed is slowly increased to 400 rpm as 1240 grams of alumina precursor of solid aluminum chlorohydroxide, $Al_2(OH)_5Cl \cdot 2H_2O$, sold under the name "Chlorohydrol," are slowly added (viscosity increases). After one hour, the mixing speed is reduced to 300 rpm and mixing is continued overnight. The vessel is then placed in a 20° – 25°C. bath and the mixing speed is reduced to 100 rpm and vacuum is applied to the vessel for simultaneous deaeration and cooling. During this step water is removed and the viscosity of the spin mix increases. When the spin mix has a viscosity of 960 poises at 26°C. it is transferred to a spinning cell. After charging the cell, a nylon plug having an air purge valve is placed in one end of the cell and a spinneret (46 holes of 4 mil diameter and 45 mil length), cap and filter assembly fixed to the other end.

The cell is mounted at the top of a 9-ft. long spinning column and pressure is applied to the nylon plug by a hydraulic ram. Filaments are extruded through the spinneret with a total mix flow rate of about 11 cc's/min. A nitrogen sweep of 10 scfm at 125°C. is introduced at the top of the spinning column and the column wall temperature is maintained at 56°C. with a spinning cell temperature of 30°C. A relative humidity gradient is maintained (1.5 percent at the top to 23 percent at the bottom of the column). The filaments are drawn at the bottom of the column by two attenuating rolls mounted one above the other — both rotating at a surface speed of 500 rpm. The 46 filament yarn is drawn around the outside of the ellipse formed by two 6 inch diameter rolls for 4 wraps and then wound up under a tension of about 5–10 grams on a refractory "Fiberfrax" bobbin mounted on a constant speed windup. The bobbin is made by rolling one-fourth inch thick felt of refractory fibers ("Fiberfrax Lo-Con-Felt") to form a cylinder, taping the cylinder with cellophane tape, and mounting it on a collapsible metal rolled cylinder, and then placing the whole assembly on the constant speed windup. A spin finish of 20 percent ethyl laurate and 80 percent Perclene perchloroethylene is applied to the yarn between the attenuating rolls and bottom of the column by drawing the yarn over a wick wet with the finish. A cake package is collected in a 15 minute period. The cake package on its refractory bobbin, is placed first in a muffle furnace and heated to 900°C. over a period of 4 hours and then in a second muffle furnace and heated to 1,300°C. in a period of 6 hours. At this point the yarn filament has greater than 100,000 psi tensile strength and can be easily handled without excessive filament breakage. The bobbin of yarn is mounted on a freely rotating spindle and yarn drawn at a rate of 10 ft/min through a propane-air flame issuing from a 6 inch long ribbon burner. The apparent temperature of the fiber as measured by an optical pyrometer (with no correction for $Al_2O_3$ emissivity at high temperature) is 1,300°C. The resultant filaments (about 0.8 mils diameter) have an average tensile strength of 227,000 psi.

b. Another spin mix with same composition as (a) is extruded in a very similar manner and the 47 filaments wound up at 600 feet/minute on a refractory bobbin. The bobbin of yarn is stored at 49°C. and 38 percent relative humidity for 18 days before firing (on the bobbin) for 1 hour at 550°C. and then 1 hour at 1,300°C. The yarn is then backwound from the bobbin and passed through a propane-air flame (1,395°C.) at 20 feet/minute. The fired fibers of 0.77 mil diameter have a tensile strength of 227,000 psi and show the crystal orientation.

c. The use of a very similar spin mix as in (a) but containing about 0.1% of very high molecular weight poly(ethylene oxide) ("Polyox FRA" sold by Union Carbide, Inc.) as a spinning aid in the general procedure of (a) yields fibers of 0.34 mil diameter with a strength of 188,000 psi after firing under conditions Z and E.

The spin mixes for a, b and c all have an X and Y value of about 60 and 52 respectively and a basicity of 0.82 for the aqueous phase.

EXAMPLE 9

This example illustrates preparation of continuous filaments containing 89.7% $Al_2O_3$, 10% $SiO_2$, 0.2% $K_2O$, 0.07% $Li_2O$, and 0.25% MgO.

A spin mix is made by blending 638 grams of a dispersion containing 69 percent Type A alumina slurry with 423 grams of Positive Sol 130M [which is a 30 percent solids (86.5% $SiO_2$, 13.5% $Al_2O_3$) aqueous dispersion of alumina coated $SiO_2$ particles (approximate diameter 16 m$\mu$) sold by E. I. du Pont de Nemours, Inc.] 14 grams of $MgCl_2 \cdot 6H_2O$, 4 grams of KCl, 2 grams of LiCl, 35 grams of concentrated HCl, 260 grams of $H_2O$ and 1150 grams of aluminum chlorohydroxide $[Al_2(OH)_5Cl \cdot 2H_2O]$.

The mixture is stirred slowly and aged for 19 hours at 80°C. When it reaches a viscosity of 188,000 cps. at 26°C., it is spun using equipment and general procedure similar to Example 8. The spin mix has X and Y values of about 39 and 45 respectively and the aqueous phase has a basicity of 0.82.

The cake package on its bobbin is placed first in a muffle furnace, with a $N_2$ purge, at room temperature, and the temperature is then raised to 550°C., the package held at the 550°C. temperature for 60 minutes; total time in the furnace is 135 minutes.

The package on its bobbin is then placed in a second furnace (preheated to 1120°C.) and is kept there while the temperature is increased to 1,200 °C. Total time at 1,200°C. is 60 minutes; total time in the furnace is 72 minutes.

After removal from the second furnace, the bobbin is mounted vertically on a freely rotating spindle and the continuous filament yarn is backwound therefrom at 20 ft./min. and passed through a propane-air flame at 1065°C.

The individual filaments (0.69 mils diameter) of the final yarn have a tensile strength of about 223,000 psi and a modulus of about 40,000,000 psi.

Similar results are obtained when the $SiO_2$ is provided by an aqueous dispersion of colloidal silica (Ludox by Du Pont Company).

Similar results are also obtained when the fibers are collected on a collapsible metal cylinder without the refractory felt, fired at 550°C. and described above, and then backwound from the cylinder (bobbin) for the flame firing, i.e., the 1,300°C. firing is omitted.

EXAMPLE 10

This example illustrates the replacement of aluminum chlorohydroxide complex salt in the spinnable mix with a basic aluminum nitrate.

a. In a 2-liter 3-necked flask fitted with a paddle stirrer, thermometer and reflux condenser is placed 448 g. $Al(NO_3)_3 \cdot 9H_2O$, 1,200 ml. distilled water and 80 g. of reagent grade granular (8–20 mesh) aluminum metal. The contents of the flask are heated to 90°C., after which external heating is disconnected since an exothermic reaction maintains the temperature at 90°–100°C. The reaction mixture is stirred for 16 hours while gas is evolved and the temperature is allowed to drop to near room temperature. The mixture is then heated again to 100°C. and maintained at this temperature for 8 hours. The excess aluminum is filtered from the clear hot solution. Analysis of the solution of basic aluminum nitrate shows that it contains the equivalent of 11.3 weight % $Al_2O_3$ and 6.1 weight % $NO_3$ for an Al/$NO_3$ molar ratio of 2.2.

A mixture comprising 400 g. of the above solution and 100 g. of Type B alumina is prepared using a household food blender, then evaporated under reduced pressure to reduce the weight of the system by 56.6 percent, after which the mixture is aged for 20 minutes at 80°C. The spin mix has X and Y values of 51.6 and 42.9 and the aqueous phase has a basicity of 0.85.

Fibers are extruded as in Example 1 using a 4 mil-diameter orifice and the fibers collected about 1 ft.

below the spinneret. After firing under conditions B, F and E, the fibers have a tensile strength of 188,000 psi. Other properties are given in Table I.

b. For purposes of comparison, a similar system is prepared that does not contain any solid oxide particles. A solution of the basic aluminum nitrate (700 g.) is combined with 31.1 g. of concentrated nitric acid (about 71 percent by weight $HNO_3$) and evaporated to obtain a 66.1 percent weight loss. After aging the system for 20 minutes at 80°C., fibers are extruded as in Example 1.

The fibers after firing under conditions D and F have a tensile strength of only 80,000 psi, a microscopic roughness of only 270A with a period of 19,200A and they do not exhibit uniform orientation.

Samples of 10a used for crystallinity, grain size and roughness in Table I are fired under conditions B and F.

4,688 g. of the aluminum chlorohydroxide solution described in Example 1 is combined with 18.9 g. of a concentrated aqueous hydrochloric acid solution (37.5 weight % HCl). The Al/Cl molar ratio is about 1.86 and the basicity is 0.82.

A 207.5 g. portion of the above solution, 145.8 g. of an aqueous dispersion that contains 51.3 percent by weight of Type A alumina particles and 3.8 g. of solid cobaltous chloride hexahydrate are combined in an "Osterizer" type blender. The resultant mixture is evaporated under reduced pressure at 80°C. to obtain a 32.4 percent weight loss, after which it is aged for 20 minutes in the 80°C. bath at atmospheric pressure. A fiber is extruded as described in Example 1.

The fibers after firing under conditions B and J are blue in color, have a diameter of 0.00075 inch and a tensile strength of 148,000 psi. Other properties are described in Table I.

TABLE I

| Example | Porosity % | Crystallinity % | Grain Dimensions (micron) Maximum Dimension | 90% or more have a dimension greater than | % grains smaller than 0.5 μ | Microscopic height A | Roughness period A | Tensile Strength psi × 10⁻³ |
|---|---|---|---|---|---|---|---|---|
| 1 | 5 | | 1.6 | 0.18 | 63 | 2750 | 5050 | 78 |
| 2 | | 85 | | | | | | 96 |
| 3a | 2 | 86 | 1.6 | 0.14 | 84 | 2720 | 4300 | 167 |
| 4a | 5 | 98 | 1.6 | 0.12 | 69 | | | 179 |
| 5a | 0 | 90 | | | | 2400 | 14,300 | 60 |
| 6 | | | | | | 2280 | 7960 | 218 |
| 7a | 0 | 90 | 1.0 | 0.09 | 100 | | | 227 |
| 8a | | | | | | | | 223 |
| 9 | | | | | | 2620 | 7300 | 188 |
| 10a | 0 | 87 | 1.5 | 0.17 | 83 | | | 120 |
| 11a | | 100 | 2.1 | 0.33 | 32 | | | 148 |
| 12 | 1 | 90 | 1.0 | 0.19 | 95 | | | |

EXAMPLE 11

This example shows the effect of firing conditions on an alumina fiber.

Aluminum chlorohydroxide solution of Example 1 (411 grams) is mixed with 3.3 grams of 37.5 percent aqueous HCl and 307 grams of an aqueous dispersion containing 48.7 percent Type A alumina, concentrated under reduced pressure at 80°C. for a 34.6 percent weight loss and aged under atmospheric pressure in a closed container at 80°C. for 20 minutes. The spin mix (X and Y values of 60.4 and 52.4 respectively and a basicity of 0.83 for the aqueous phase) is extruded through a spinneret having 11 orifices of 4 mil diameter. All fibers are fired under conditions B and J. One batch (a) of fibers is additionally fired for 24 hours at 1,500°C. and exhibits a maximum grain dimension of about 2.1 microns. 32 percent Of the grains are smaller than 0.5 micron. A second batch (b) of fibers is additionally fired for three hours at 1,700°C. The fibers exhibit substantially no grains smaller than 0.5 microns and an average maximum dimension of 6.5 microns.

These results indicate that firing the present fibers for up to 24 hours at temperatures between about 1,300° and 1500°C. will not cause the grains to grow beyond the limits desired for high tensile strength. The upper time limit decreases from 24 hours to several minutes as the firing temperature is increased from 1,500° to 1,700°C. Other properties are described in Table I.

EXAMPLE 12

This example describes the addition of a cobaltous salt as a modifier to the extrudable system.

EXAMPLE 13

The entire procedure of Example 8b is essentially followed with the difference that a somewhat smaller size particle size alumina is used having 99.2 percent smaller than an e.s.d. of 0.7 μ and 96.2 percent smaller than an e.s.d. of 0.5 μ. The initial crude dispersion of XA-16 alumina is allowed to settle for 48 hours (as opposed to 24 hours for the Type A particles) before withdrawing the supernatant dispersion.

The fired fibers have a tensile strength of 229,000 psi, a microscopic roughness height of 1,100A, a microscopic roughness period of 4,800A, a maximum grain dimension of 1.4 μ, with 90 percent of the grains having a dimension greater than 0.17 μ and 82 percent of the grains being smaller than 0.5 μ.

The preceding representative examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. A spinnable composition comprising solid particles and an aqueous phase wherein:
   1. the solid particles are such that a. when measured for equivalent spherical diameter, 99.5 percent or more by weight are smaller than about 5 microns, about 98 percent or more by weight are smaller than 3 microns, and about 50 percent or more by weight are greater than 0.2 micron, b. when measured from electron micrographs, none have a dimension less than about 0.005 micron, and c. at least about 80 percent by weight of the total particle weight is alumina, 2. the aqueous phase has dissolved in it at least one member of the class consisting of at least one precursor of alumina, at least one precursor of an oxide that forms a solid solution with alumina, and a mixture of both, 3. the solid particles provide between about 13 percent and 97 percent by weight of the total available oxide content of the mix, and 4. the amount of alumina available from the solid particles and the precursor of alumina is at least 60 percent by weight of the total available oxide content of the mix.

2. The composition of claim 1 wherein the aqueous phase contains a precursor of alumina.

3. The composition of claim 2 wherein the precursor of alumina is a basic aluminum salt having a basicity of between about 0.33 and 0.83.

4. The composition of Claim 3 wherein the basic alumina salt is aluminum chlorohydroxide and the weight of the particles and the precursor is governed by the expression
$Y(\pm 8\%) = 43.4 + 0.395 (X-44.1) + 0.00476 (X-44.1)^2$
in which Y is the percent by weight of the total available oxides based on the composition, and X is the percent by weight of oxides derived from the solid particles, based on the total available oxides.

5. The composition of claim 4 wherein the solid particles are substantially all particles of $\alpha$-alumina.

6. The composition of claim 1 wherein 80 percent or more of the solid particles are smaller than 0.5 micron when measured for equivalent spherical diameter, and none are less than about 0.02 micron when measured from electron micrographs; the solid particles provide between 35 percent and 75 percent by weight of the total available oxide content of the mix and the amount of alumina available from the solid particles and the precursor of alumina is at least 80 percent by weight of the total available oxide content of the mix.

7. The composition of claim 6 wherein the aqueous phase contains a precursor of alumina.

8. The composition of claim 7 wherein the precursor of alumina is a basic aluminum salt having a basicity of between about 0.33 and 0.83.

9. The composition of claim 8 wherein the basic aluminum salt is aluminum chlorohydroxide and the weight of the particles and the precursor is governed by the expression
$Y(\pm 8\%) = 43.4 + 0.395 (X-44.1) + 0.00476 (X-44.1)^2$
in which Y is the percent by weight of the total available oxides based on the composition, and X is the percent by weight of oxides derived from the solid particles, based on the total available oxides.

10. The composition of claim 9 wherein the solid particles are substantially all particles of $\alpha$-alumina.

11. The composition of claim 10 wherein higher molecular weight poly(ethylene oxide) is present in an amount of up to 5 percent by weight of total available oxides.

12. The composition of claim 1 wherein the solid particles are substantially all $\alpha$-alumina particles.

13. The composition of claim 12 wherein the aqueous phase contains a precursor of alumina.

14. The composition of claim 13 wherein the precursor of alumina is a basic aluminum salt having a basicity of between about 0.33 and 0.83.

15. The composition of claim 14 wherein the basic aluminum salt is aluminum chlorohydroxide and the weight of the particles and the precursor is governed by the expression
$Y(\pm 8\%) = 43.4 + 0.395 (X-44.1) + 0.00476 (X-44.1)^2$
in which Y is the percent by weight of the total available oxides based on the composition, and X is the percent by weight of oxides derived from the solid particles, based on the total available oxides.

16. A polycrystalline ceramic oxide fiber comprising at least about 60 percent by weight $Al_2O_3$, based on the weight of fiber, at least part of said $Al_2O_3$ being in an $\alpha$-alumina phase, said fiber having 1. at least one dimension less than about 0.01 inch, 2. a crystallinity greater than about 85 percent, 3. a porosity of less than about 10 percent, 4. a distribution of grain size wherein substantially all the grains are less than about 3 microns in diameter, at least 30 percent of the grains are less than about 0.5 micron in diameter, and at least about 10 percent of the grains are larger than about 0.04 micron in diameter, 5. a microscopic roughness height between about 1,100A and 7,000A and a microscopic roughness period between about 4,000A and 15,000A, and 6. a uniform orientation, as determined by optical birefringence.

17. The fiber of claim 16 wherein the grains comprise substantially the entire volume of the fiber.

18. The fiber of claim 16 wherein there is present a crystalline phase selected from mullite or a solid solution of aluminum oxide and chromium oxide.

19. The fiber of claim 16 wherein the fiber is at least 80 percent by weight $Al_2O_3$.

20. The fiber of claim 19 wherein the fiber also exhibits crystal orientation, as determined by X-ray analysis.

21. The fiber of claim 19 wherein the fiber is substantially all $\alpha$-alumina.

22. The fiber of claim 16 wherein the fiber is substantially all $\alpha$-alumina.

23. The fiber of claim 16 wherein the fiber also exhibits crystal orientation, as determined by X-ray analysis.

24. The fiber of claim 23 wherein the fiber is substantially all $\alpha$-alumina.

25. Process for preparing ceramic oxide fibers which comprises extruding the composition of claim 1 in filamentary form and firing the extruded product at a first stage temperature between about 350°C. and 600°C. for one to two hours, followed by a second stage of either (a) firing at a temperature between about 1,300° and 1,500°C. for one half to two hours, or (b) firing by passing the fiber through the flame of a propane-oxygen torch for no more than up to 5 seconds residence time, or (c) a combination of (a) followed by (b).

* * * * *